(12) United States Patent
Lin

(10) Patent No.: US 11,756,278 B2
(45) Date of Patent: Sep. 12, 2023

(54) METHOD AND SYSTEM OF ESTABLISHING DENTURE DENTITION MODEL

(71) Applicant: ASUSTeK COMPUTER INC., Taipei (TW)

(72) Inventor: Wei-Po Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 114 days.

(21) Appl. No.: 17/396,848

(22) Filed: Aug. 9, 2021

(65) Prior Publication Data

US 2022/0051486 A1 Feb. 17, 2022

(30) Foreign Application Priority Data

Aug. 14, 2020 (CN) .......................... 202010816726.8

(51) Int. Cl.
| | |
|---|---|
| *G06T 19/20* | (2011.01) |
| *A61C 13/00* | (2006.01) |
| *A61C 7/00* | (2006.01) |
| *A61C 9/00* | (2006.01) |
| *G06T 7/13* | (2017.01) |

(52) U.S. Cl.
CPC .............. *G06T 19/20* (2013.01); *A61C 7/002* (2013.01); *A61C 9/006* (2013.01); *A61C 13/0004* (2013.01); *G06T 7/13* (2017.01); *G06T 2207/30201* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | | |
|---|---|---|---|---|
| 10,695,146 | B1* | 6/2020 | Raslambekov | ........ A61C 7/002 |
| 2010/0311028 | A1* | 12/2010 | Bell, III | ................. G09B 23/30 434/263 |

(Continued)

FOREIGN PATENT DOCUMENTS

| | | |
|---|---|---|
| CN | 106626351 A | 5/2017 |
| CN | 105287027 B | 6/2018 |

(Continued)

*Primary Examiner* — Kyle Zhai
(74) *Attorney, Agent, or Firm* — McClure, Qualey & Rodack, LLP (57) ABSTRACT

A method for establishing a denture dentition model includes: obtaining face information and teeth alignment information of a use, to establish a three-dimensional mouth-opening face model and an original teeth model, and superimposing the original teeth model to the three-dimensional mouth-opening face model; establishing a reference line corresponding to each of the teeth of the original teeth model; generating a plurality of grids on the three-dimensional mouth-opening face model according to the reference lines, and adjusting each of the grids to correspond to the edge of each tooth, to obtain an actual size of each of the teeth; providing an upper edge curve and a lower edge curve on the three-dimensional mouth-opening face model as a smile curve; aligning each grid with the smile curve, and placing a denture model in each grid; and adjusting a denture contour of each denture model, to generate the denture dentition model.

22 Claims, 9 Drawing Sheets

(56) References Cited

U.S. PATENT DOCUMENTS

2013/0158958 A1* 6/2013 Methot ................. G16H 20/40
                                                      703/1
2013/0325431 A1* 12/2013 See ......................... G16B 5/00
                                                     703/11
2020/0000552 A1* 1/2020 Mednikov .............. G16H 50/50

FOREIGN PATENT DOCUMENTS

| CN | 110623760 A | 12/2019 |
| CN | 110334444 B | 3/2020 |

* cited by examiner

METHOD AND SYSTEM OF ESTABLISHING DENTURE DENTITION MODEL

CROSS-REFERENCE TO RELATED APPLICATION

This application claims the priority benefit of Chinese applications serial No. 202010816726.8, filed on Aug. 14, 2020. The entirety of the above-mentioned patent application is hereby incorporated by reference herein and made a part of specification.

BACKGROUND OF THE INVENTION

Field of the Invention

The invention relates to a method and a system of establishing denture dentition model.

Description of the Related Art

The traditional teeth smile curve design method is using a camera to take a picture of the user and an object with a specific length to obtain a two-dimensional (2D) teeth photo of the user, deducing the length and width of the teeth via a scale method, and then drawing the teeth smile curve on the 2D teeth photo, so that dentists and patients would communicate easily. However, using scale to measure the teeth sizes is relatively inaccurate, which is likely to cause measurement errors. Moreover, the design method is unable to correctly design side teeth, and it is difficult to evaluate the production of the denture or the dental film and its fitness with the real teeth.

BRIEF SUMMARY OF THE INVENTION

According to the first aspect of the disclosure, a method for establishing a denture dentition model is provided herein. The method for establishing a denture dentition model includes: obtaining face information of a user, to establish a three-dimensional mouth-opening face model; obtaining teeth alignment information of the user, to establish an original teeth model, and superimposing the original teeth model to the three-dimensional mouth-opening face model; establishing a reference line corresponding to each of a plurality of teeth of the original teeth model; generating a plurality of grids on the three-dimensional mouth-opening face model according to the reference lines, and adjusting each of the grids to correspond to the edge of each tooth, so as to obtain an actual size of each of the teeth; providing an upper edge curve and a lower edge curve on the three-dimensional mouth-opening face model as a smile curve; aligning each of the grids with the smile curve, and placing a denture model in each of the grids; and adjusting a denture contour of each of the denture models, to generate the denture dentition model.

According to the second aspect of the disclosure, a denture dentition model establishing system is provided herein. The denture dentition model establishing system includes a three-dimensional image capture device, a tooth image capture device and a computing device. The three-dimensional image capture device is configured to obtain face information of a user. The tooth image capture device is configured to obtain the teeth alignment information of the user. The computing device is electrically connected to the three-dimensional image capture device and the tooth image capture device. And the computing device establishes a three-dimensional mouth-opening face model according to the face information, and establishes an original teeth model according to teeth alignment information. The computing device is used for: superimposing the original teeth model to the three-dimensional mouth-opening face model; establishing a reference line corresponding to each of a plurality of teeth of the original teeth model; generating a plurality of grids on the three-dimensional mouth-opening face model according to the reference lines, and adjusting each grid to correspond to the edge of each tooth, so as to obtain an actual size of each tooth; providing an upper edge curve and a lower edge curve on the three-dimensional mouth-opening face model as a smile curve; aligning each of the grids with the smile curve, and placing a denture model in each of the grids; and adjusting a denture contour of each of the denture models, to generate the denture dentition model.

In summary, a method for replacing the 2D teeth photos in prior art by a three-dimensional (3D) model is provided, which allows the dentist to observe the designed denture shape from different angles to satisfy patients with the ideal smile curve. Further to provide accurate dimension information such as length, width and thickness for the ideal denture dentition model with the smile curve and increase the measurement accuracy.

The detailed content of other effects and embodiments of the disclosure are described as follows with the drawings.

DETAILED DESCRIPTION OF THE EMBODIMENTS

All of the positional relationship described in the following embodiments, including up, down, left, and right, unless otherwise specified, are based on the direction of the components shown in the drawings.

Figure 1A:
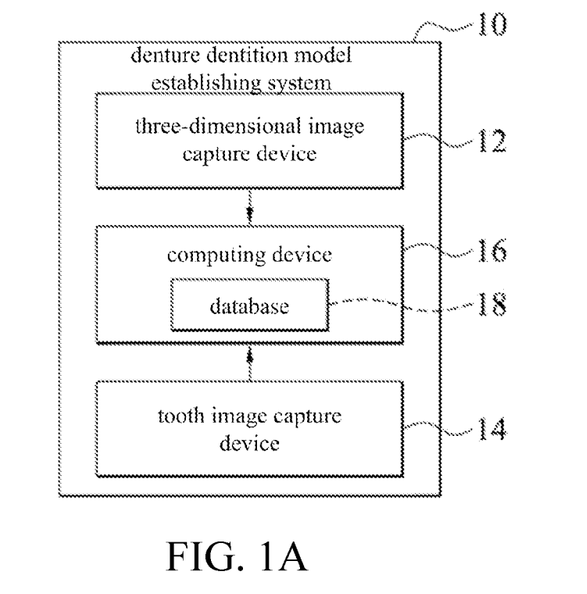
FIG. 1A is a block diagram of a system for establishing a denture dentition model according to an embodiment.
Figure 1B:
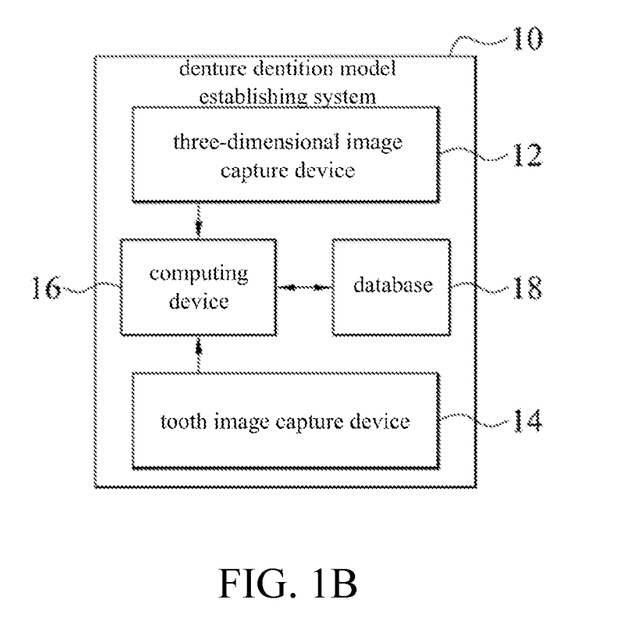
FIG. 1B is a block diagram of a system for establishing a denture dentition model according to another embodiment.

Please refer to FIG. 1A and FIG. 1B, the denture dentition model establishing system 10 includes a three-dimensional image capture device 12, a tooth image capture device 14 and a computing device 16. The three-dimensional image capture device 12 is configured to obtain face information of a user, such as mouth-opening face information. In an embodiment, the tooth image capture device 14 is configured to capture teeth alignment information of the user. The computing device 16 is electrically connected to the three-dimensional image capture device 12 and the tooth image capture device 14, to receive the face information and the teeth alignment information and perform subsequent calculations and applications accordingly. The denture dentition model establishing system 10 further includes a database 18 to store a plurality of denture models. In an embodiment, as shown in FIG. 1A, the database 18 is established in the computing device 16. In an embodiment, as shown in FIG. 1B, the computing device 16 is electrically connected to the database 18, to facilitate access to the denture models or other related data in the database 18.

In an embodiment, the three-dimensional image capture device 12, the tooth image capture device 14 and the computing device 16 are separate devices. In an embodiment, the three-dimensional image capture device 12 is a three-dimensional face scanning machine, and the tooth image capture device 14 is a three-dimensional mouth scanner or a two-dimensional image capture device (two-dimensional camera), and the computing device 16 is a mobile phone, a notebook computer, a tablet computer, a desktop computer, which is not limited herein. In another embodiment, the three-dimensional image capture device 12, the tooth image capture device 14, and the computing device 16 is integrated as a single electronic device (not shown in figures). The three-dimensional image capture device 12 is a built-in three-dimensional depth scanner, and the tooth image capture device 14 is a built-in two-dimensional camera, the computing device 16 is a central processing unit or a microcontroller, and the electronic device is a mobile phone, a notebook computer, a tablet computer or a desktop computer, which is not limited herein.

Figure 2:
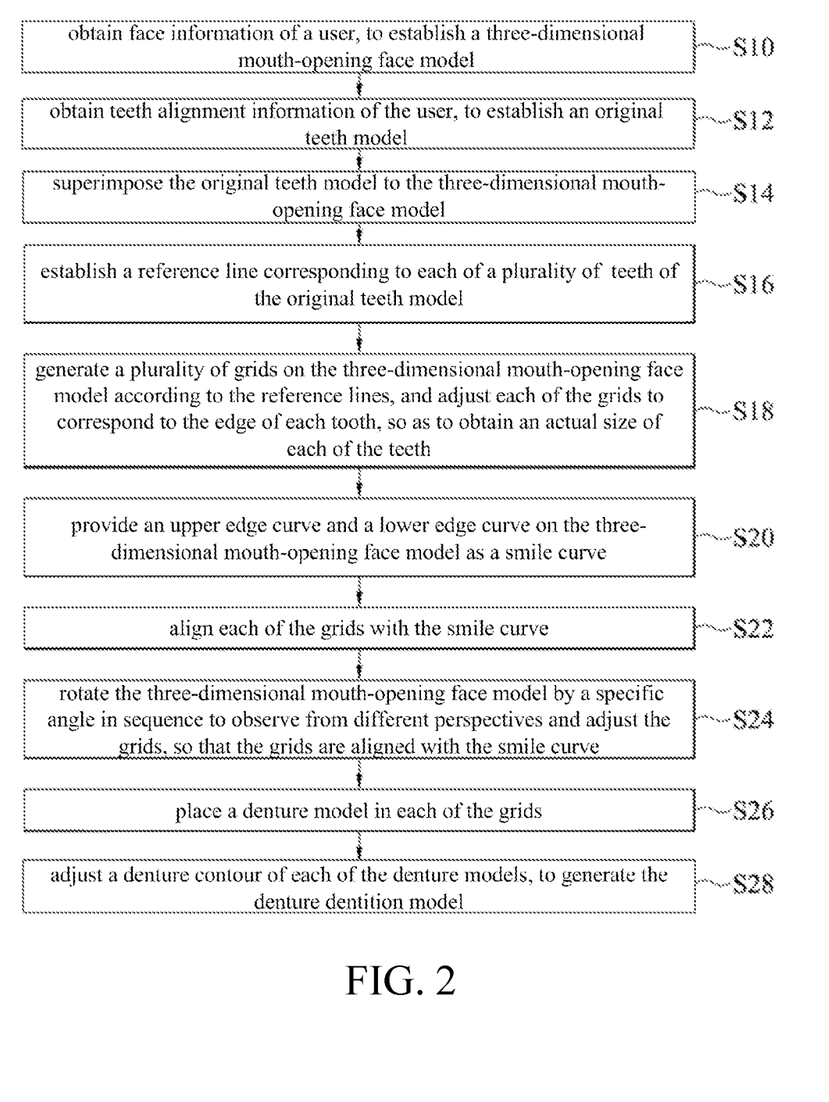
FIG. 2 is a schematic flow chart of a method for establishing a denture dentition model according to an embodiment.
Figure 3:
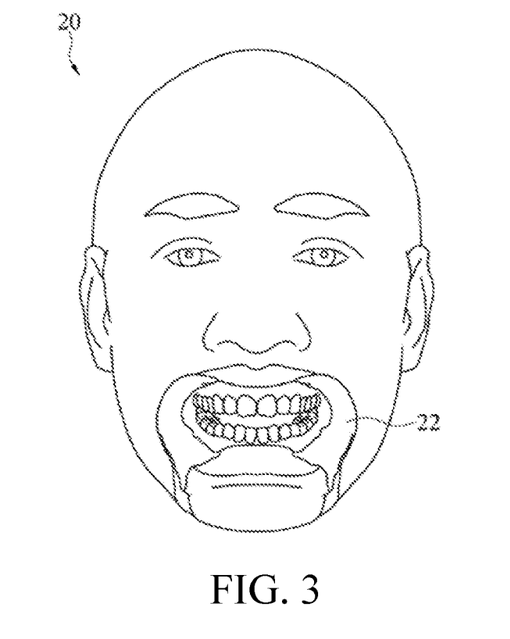
FIG. 3 is a schematic diagram of a three-dimensional mouth-opening face model according to an embodiment.

FIG. 2 is a schematic flow chart of a method for establishing the denture dentition model according to an embodiment. Please refer to FIG. 1A, FIG. 1B and FIG. 2. In step S10, the three-dimensional image capture device 12 scans and photographs the face of the user to obtain the face information and transmit it to the computing device 16. The face information is the mouth-opening face information, and the computing device 16 receives the face information and performs calculations to establish a three-dimensional mouth-opening face model 20 as shown in FIG. 3. In an embodiment, the mouth-opening face information is the face information with the user wearing a mouth opener, thus the three-dimensional mouth-opening face model 20 is a face model with the mouth opener 22 that expose the teeth in the user's mouth.

Figure 4:
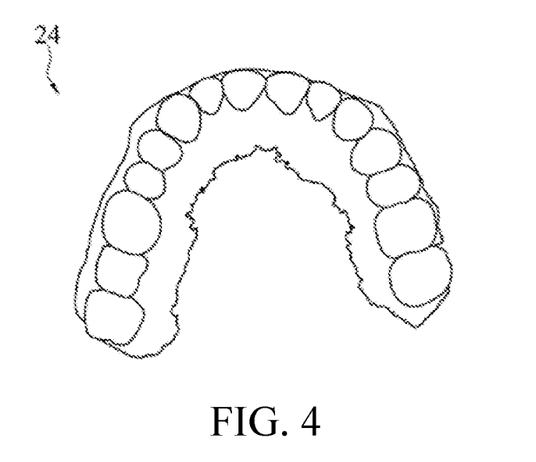
FIG. 4 is a schematic diagram of a three-dimensional original teeth model according to an embodiment.
Figure 5:
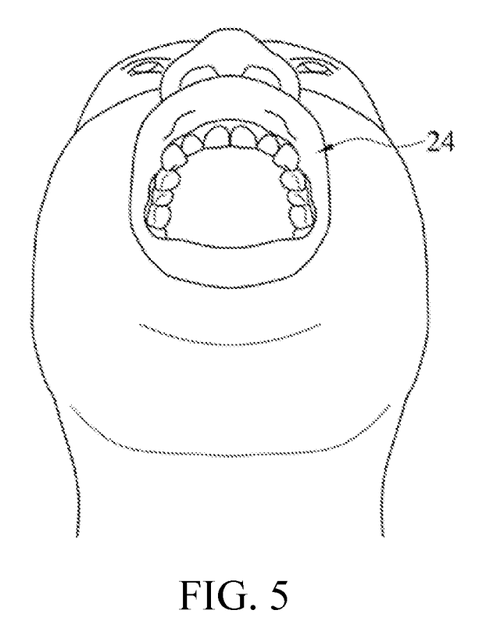
FIG. 5 is a schematic diagram of a two-dimensional original teeth model according to an embodiment.

In step S12, the tooth image capture device 14 photographs the inner side of the user's oral cavity to obtain the user's teeth arrangement information and transmit it to the computing device 16. The computing device 16 receives the teeth alignment information and performs calculations to establish an original teeth model 24 as shown in FIG. 4 or FIG. 5. When the tooth image capture device 14 is the three-dimensional mouth scanner, the original teeth model 24 is a three-dimensional original teeth model as shown in FIG. 4; and when the tooth image capture device 14 is the two-dimensional image capture device, the original teeth model 24 is a two-dimensional original teeth model as shown in FIG. 5.

After obtaining the three-dimensional mouth-opening face model 20 and the original teeth model 24, as shown in step S14, the computing device 16 superimposes the original teeth model 24 to the three-dimensional mouth-opening face model 20. In an embodiment, the lower edge of the incisor is used as a reference line for superposing and aligning when superimposing.

Figure 6:
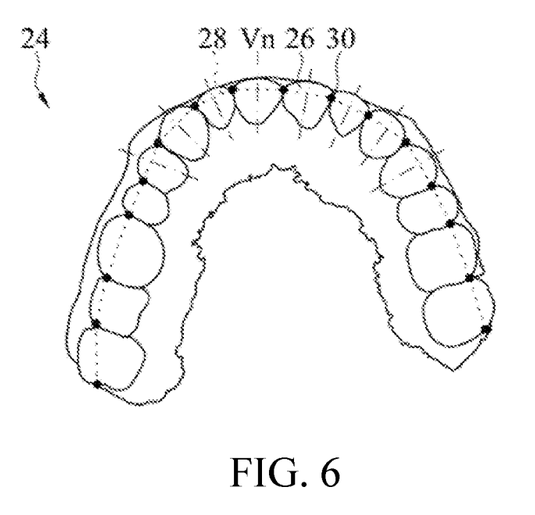
FIG. 6 is a schematic diagram of an original teeth model with a plurality of reference lines according to an embodiment.

As shown in step S16, the computing device 16 establishes reference lines 28 corresponding to each of the plurality of teeth 26 of the original teeth model 24 (the three-dimensional original teeth model is taken as an example herein). As shown in FIG. 6, when the computing device establishes the reference lines 28, the contact points 30 of the adjacent teeth 26 are set firstly, and then the corresponding reference line 28 is generated along the vertical plane of the normal vector Vn of each tooth 26 according to the contact points 30 of both sides of each tooth 26. Each tooth 26 includes one reference line 28, which makes the adjacent reference lines 28 are connected and forms an arc shape.

Figure 7:
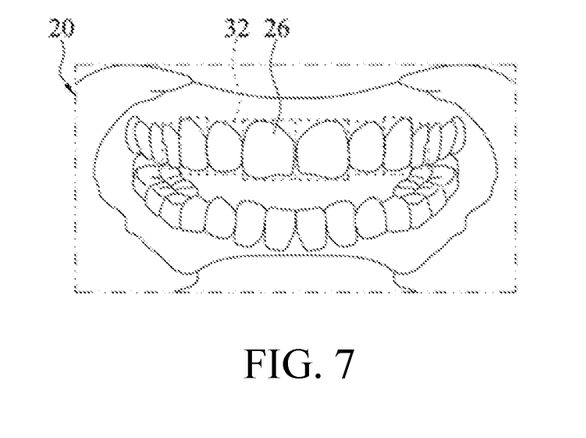
FIG. 7 is a partial schematic diagram of a three-dimensional mouth-opening face model with a grid according to an embodiment.

As shown in step S18, according to the reference lines 28 generated above, the computing device 16 generates a plurality of grids 32 on the three-dimensional mouth-opening face model 20. As shown in FIG. 7, the embodiment takes eight grids 32 as an example, each of the grids 32 is adjusted to correspond to the edge of each tooth 26 and obtains an actual size of each tooth 26. When a grid 32 is not aligned with a tooth 26, the position or size of the grid 32 is adjusted to make the grid 32 exactly arranged on the edge of each tooth 26 to completely cover the single tooth 26 to obtain an actual size of each tooth 26.

Figure 8:
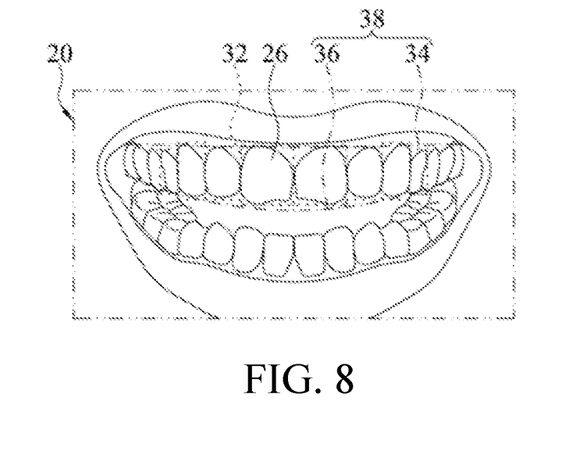
FIG. 8 is a partial schematic diagram of a three-dimensional mouth-opening face model according to an embodiment.

As shown in step S20, the computing device 16 provides an upper edge curve 34 and a lower edge curve 36 on the three-dimensional mouth-opening face model 20. As shown in FIG. 8, the computing device 16 adjusts the upper edge curve 34 and the lower edge curve 36 corresponding to the upper teeth of the three-dimensional mouth-opening face model 20 to serve as a smile curve 38.

Figure 9:
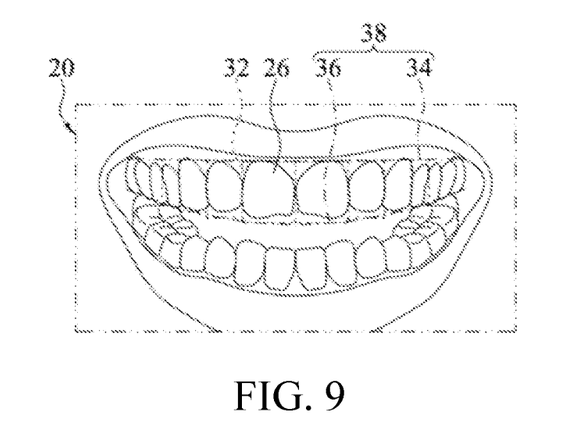
FIG. 9 is a partial schematic diagram of a three-dimensional mouth-opening face model with an adjusted grid according to an embodiment.

As shown in step S22, the edge lines of the grids 32 are adjusted by the computing device 16 to align with the smile curve 38, and makes the upper and lower edge lines of the grids 32 to contact the upper edge curve 34 and the lower edge curve 36 respectively, and adjusts the left and right edge lines with a suitable width for all the grids 32 are aligned and superimposed with the smile curve 38. The adjusted grids 32 are shown in FIG. 9.

Figure 10:
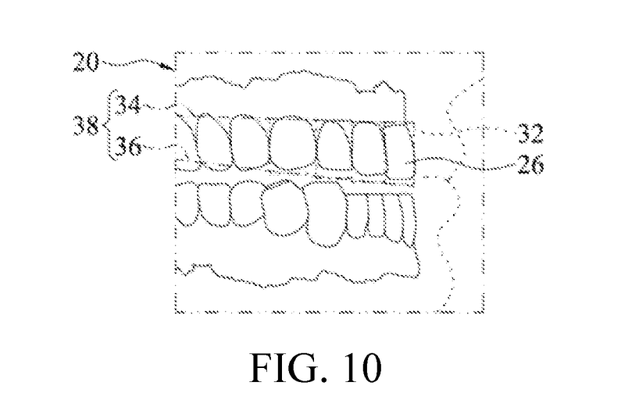
FIG. 10 is a partial schematic diagram of a three-dimensional mouth-opening face model rotated by a specific angle according to an embodiment.

In order to ensure that each angle of the teeth 26 are aligned with the smile curve 38, as shown in step S24, the computing device 16 rotates the three-dimensional mouth-opening face model 20 by a specific angle in sequence to observe from different perspectives and adjust the grids 32 to be aligned with the smile curve 38. As shown in FIG. 10, the computing device 16 rotates the three-dimensional mouth-opening face model 20 to the right by a specific angle about 30 degrees, to observe and adjust each of the grids 32 to make all the grids 32 be aligned and superimposed with the smile curve 38. In the same way, the three-dimensional mouth-opening face model 20 is also rotated to the left by a specific angle, such as 30 degrees, to confirm that all the grids 32 is aligned and superimposed with the smile curve 38.

Figure 11:
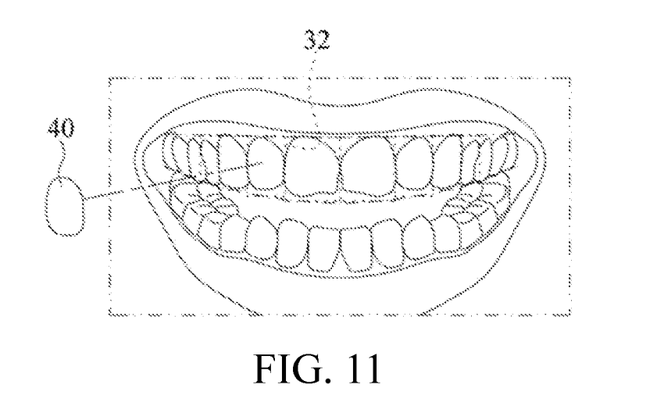
FIG. 11 is a schematic diagram of selecting a suitable denture model according to an embodiment.
Figure 12:
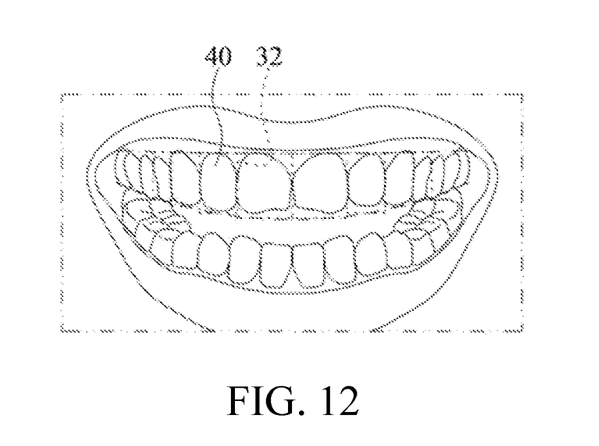
FIG. 12 is a schematic diagram of a denture model placed in a grid according to an embodiment.

As shown in step S26, the computing device 16 takes the size of the adjusted grids 32 as a search index, as shown in FIG. 11 and FIG. 12, to find appropriate three-dimensional denture models 40 from a built-in database 18 (as shown in FIG. 1A) or an external database 18 (as shown in FIG. 1B), and fill them in the grids 32 correspondingly. By analogy, each grid 32 is placed with one denture model 40 respectively. In one embodiment, the denture models 40 are dental film models or braces models.

Figure 13:
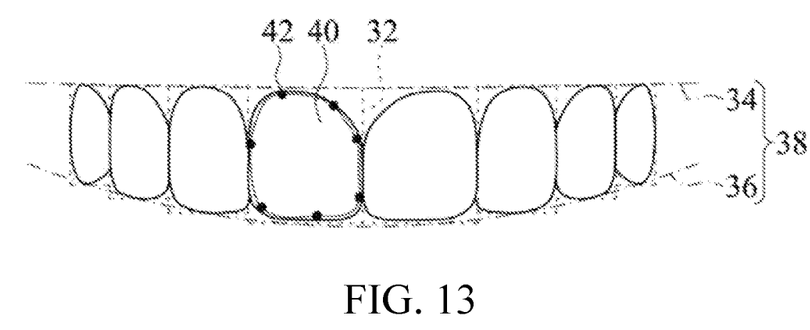
FIG. 13 is a schematic diagram of a teeth model for adjusting a denture contour according to an embodiment.
Figure 14:
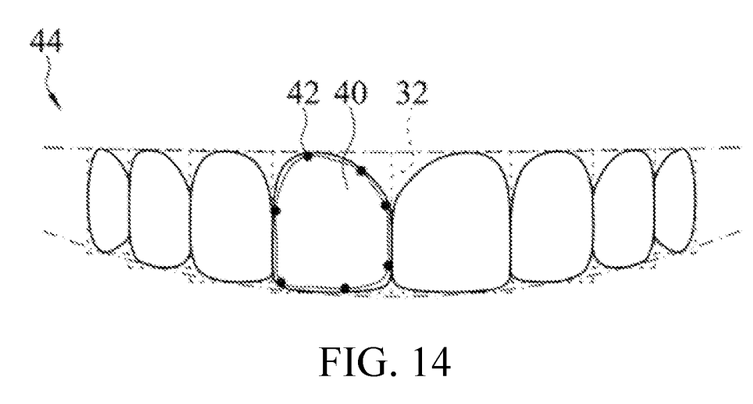
FIG. 14 is a schematic diagram of a denture dentition model after adjustment according to an embodiment.

After the denture models 40 are placed in each grid 32, the eight denture models 40 are roughly arranged along the smile curve 38 as shown in FIG. 13. Then, as shown in step S28, the computing device 16 adjusts the denture contours of the denture models 40 to generate a denture dentition model 44. In detail, as shown in FIG. 13 and FIG. 14, a profile contour of the denture models 40 is found on the plane of the grids 32 perpendicular to the sight line. Then the computing device 16 automatically generates multiple control points 42 on the profile contour, and the position and curvature of the control points 42 are adjustable to generate a satisfactory denture contour. In one embodiment, the denture model 40 in each of the grids 32 is adjusted individually, which includes finding the profile contour of each denture model 40 and the control points 42 to be adjusted to obtain a satisfactory denture contour. In another embodiment, the denture models 40 within half of the grids 32 (for example, the four grids in the left half) are adjusted to find the profile contour of the denture models 40 and the control points 42 thereof to adjust the denture contour, and then the denture contour of the denture models 40 within the other half of the grids 32 (for example, the four grids in the right half) is copied by a mirror method and fine-tuned to complete the adjustment of all the denture models 40 to generate the denture dentition model 44 as shown in FIG. 14.

Figure 15:
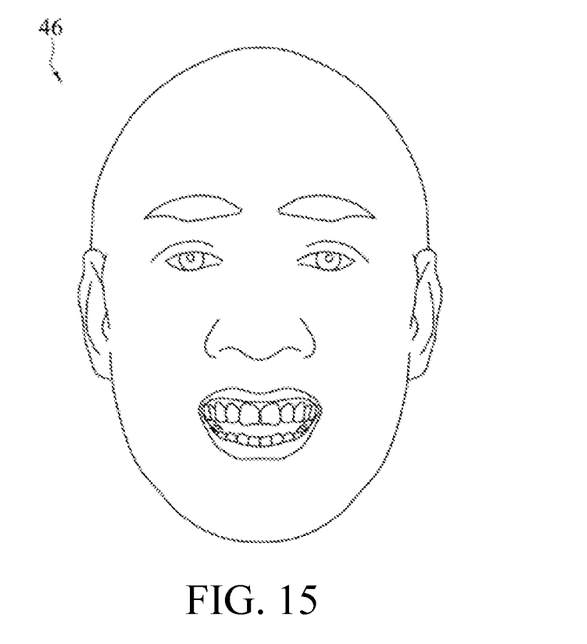
FIG. 15 is a schematic diagram of a three-dimensional smiling face model according to an embodiment.
Figure 16:
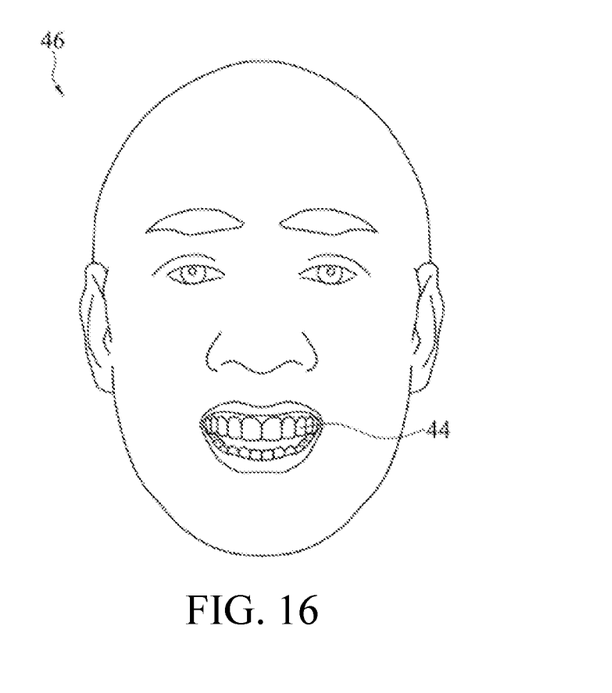
FIG. 16 is a schematic diagram of the three-dimensional smiling face model with a denture dentition model according to an embodiment.

Please refer to FIG. 1A, FIG. 1B and FIG. 2. In one embodiment, the face information further includes mouth-opening face information and smiling face information. The three dimensional image capture device 12 transmits the acquired mouth-opening face information to the computing device 16, and then the computing device 16 performs calculations and establishes the three-dimensional mouth-opening face model 20 as shown in FIG. 3. In addition, the three-dimensional image capture device 12 also transmits the smiling face information to the computing device 16, and the computing device 16 performs calculations and establishes a three-dimensional smiling face model 46, which is shown in FIG. 15. Therefore, after generating the denture dentition model 44 as shown in FIG. 14, the computing device 16 further superimposes the denture dentition model 44 into the three-dimensional smiling face model 46, as shown in FIG. 16, to view the overall shape when the user smiles normally. When the overall shape is unable to use (for example, the user is not satisfied with the shapes of the denture models), the computing device 16 repeats step S28 to readjust the denture contours of the denture models 40 in the denture dentition model 44 until the user satisfies with the denture dentition model 44 with the smile curve.

Furthermore, after the ideal denture dentition model is determined in the three-dimensional model, it is directly transmitted to a three-dimensional dental engraving machine or other three-dimensional denture editing and manufacturing software for three-dimensional printing or grinding to complete an actual three-dimensional denture (including braces or dental film) finished product.

The method disclosed herein includes a plurality of steps or actions for implementing the method. Without departing from the scope of the claim, the steps in the foregoing method are interposed with each other in some embodiment. For example, in the flowchart shown in FIG. 2, step S10 and step S12 may be interposed with each other. In other words, obtaining the three-dimensional mouth-opening face model 20 in FIG. 3 or the original teeth model 24 in FIG. 4 or FIG. 5 in the beginning does not affect subsequent calculation. The subsequent superimposed alignment of step S14 is still performed without being affected by the interposed steps. Without departing from the scope of the claims, the steps in the method are omitted in some embodiments. For example, in the flowchart shown in FIG. 2, where the step S24 is omitted, and all the grids are adjusted to align with the smile curve at this time in step S22, which is not limited herein.

In summary, a three-dimension model configures to replace the traditional two-dimension teeth photos, allowing the dentist to observe the determined denture from different angles and determine whether it satisfies the user with the ideal smile curve. Also to provide accurate length, width and thickness information to determine the ideal denture dentition model with the smile curve and increase the measurement accuracy. In addition, when the simulated three-dimensional denture model is superimposed on the original teeth model of the user, the user clearly realizes the possible problems encountered in the denture fitting process, and avoids medical disputes.

The foregoing embodiments and/or embodiments are merely used to describe preferred embodiments and/or embodiments for implementing the technology of the disclosure, rather than limit the embodiments of the technology of the disclosure in any form. Any person skilled in the art may make, without departing from the scope of the technical solutions disclosed by content of the disclosure, some changes or modifications to form other equivalent embodiments. The other equivalent embodiments should be regarded as technologies or embodiments that are substantially the same as the disclosure.

What is claimed is:

1. A method for establishing a denture dentition model, comprising:
    obtaining face information of a user, to establish a three-dimensional mouth-opening face model;
    obtaining teeth alignment information of the user, to establish an original teeth model, and superimposing the original teeth model to the three-dimensional mouth-opening face model;
    establishing reference lines corresponding to each of a plurality of teeth of the original teeth model;
    generating a plurality of grids on the three-dimensional mouth-opening face model according to the reference lines, and adjusting each of the grids to correspond to the edge of each tooth, so as to obtain an actual size of each of the teeth;
    providing an upper edge curve and a lower edge curve on the three-dimensional mouth-opening face model as a smile curve;
    aligning each of the grids with the smile curve, and placing a denture model in each of the grids; and
    adjusting a denture contour of each of the denture models, to generate the denture dentition model.

2. The method for establishing a denture dentition model according to claim 1, wherein the face information comprises mouth-opening face information and smiling face information, to establish the three-dimensional mouth-opening face model and a three-dimensional smiling face model respectively.

3. The method for establishing a denture dentition model according to claim 2, wherein after the step of generating the denture dentition model, further comprises superimposing the denture dentition model to the three-dimensional smiling face model to check an overall shape, and re-adjusting the denture contours of the denture models in the denture dentition model when the overall shape is unable to use.

4. The method for establishing a denture dentition model according to claim 2, wherein the mouth-opening face information is the face information of the user wearing a mouth opener.

5. The method for establishing a denture dentition model according to claim 1, wherein the original teeth model is a three-dimensional original teeth model or a two-dimensional original teeth model.

6. The method for establishing a denture dentition model according to claim 1, wherein the step of establishing the reference line corresponding to each of the teeth further comprises:
setting contact points between each of the teeth and its adjacent teeth; and
generating the reference line along a vertical plane of a normal vector of the each tooth according to the contact points on two sides of each of the teeth.

7. The method for establishing a denture dentition model according to claim 1, wherein the step of adjusting the grids further comprises rotating the three-dimensional mouth-opening face model to adjust the grids from different perspectives to align with the smile curve.

8. The method for establishing a denture dentition model according to claim 1, wherein the denture models are obtained from a database.

9. The method for establishing a denture dentition model according to claim 1, wherein the denture models are dental film model or braces model.

10. The method for establishing a denture dentition model according to claim 1, wherein the step of adjusting the denture contours of the denture models further comprises:
adjusting the denture model of each of the grids to find a profile contour of the denture model, and
generating a plurality of control points on the profile contour, and positions and curvature of the control points is adjustable to generate the denture contour.

11. The method for establishing a denture dentition model according to claim 1, wherein the step of adjusting the denture contours of the denture models further comprises:
adjusting half of the denture models within the grids to find a profile contour of the denture models, and generating a plurality of control points on the profile contour, and positions and curvature of the control points is adjustable make the denture contour conforming; copying the denture contour of the denture models in another half of the grids by mirroring, and making fine adjustments.

12. A denture dentition model establishing system, comprising:
a three-dimensional image capture device, configured to obtain face information of a user;
a tooth image capture device, configured to obtain the teeth alignment information of the user; and
a computing device, electrically connected to the three-dimensional image capture device and the tooth image capture device, the computing device establishes a three-dimensional mouth-opening face model according to the face information, and establishes an original teeth model according to teeth alignment information, the computing device configures to execute following steps:
superimposing the original teeth model to the three-dimensional mouth-opening face model;
establishing reference lines corresponding to each of a plurality of teeth of the original teeth model;
generating a plurality of grids on the three-dimensional mouth-opening face model according to the reference lines, and adjusting each of the grids to correspond to the edge of each tooth, so as to obtain an actual size of each of the teeth;
providing an upper edge curve and a lower edge curve on the three-dimensional mouth-opening face model as a smile curve;
aligning each of the grids with the smile curve, and placing a denture model in each of the grids; and
adjusting a denture contour of each of the denture models, to generate the denture dentition model.

13. The denture dentition model establishing system according to claim 12, wherein the face information comprises mouth-opening face information and smiling face information, and the computing device establishes the three-dimensional mouth-opening face model and a three-dimensional smiling face model respectively.

14. The denture dentition model establishing system according to claim 13, wherein the computing device further superimposes the denture dentition model to the three-dimensional smiling face model to check an overall shape, and re-adjusts the denture contours of the denture models in the denture dentition model when the overall shape is unable to use.

15. The denture dentition model establishing system according to claim 13, wherein the mouth-opening face information is the face information of the user wearing a mouth opener.

16. The denture dentition model establishing system according to claim 12, wherein the original teeth model is a three-dimensional original teeth model when the tooth image capture device is a three-dimensional mouth scanner; and the original teeth model is a two-dimensional original teeth model when the tooth image capture device is a two-dimensional image capture device.

17. The denture dentition model establishing system according to claim 12, wherein the computing device further set contact points between each of the teeth and its adjacent teeth; and generate the corresponding reference line along a vertical plane of a normal vector of the each tooth according to the contact points on two sides of each of the teeth.

18. The denture dentition model establishing system according to claim 12, wherein the computing device further rotates the three-dimensional mouth-opening face model to adjust the grids from different perspectives to align with the smile curve.

19. The denture dentition model establishing system according to claim 12, further comprises a database, for storing the dentures model.

20. The denture dentition model establishing system according to claim 12, wherein the denture models are dental film models or braces models.

21. The denture dentition model establishing system according to claim 12, wherein the computing device further adjusts the denture model in each of the grids to find a profile contour of the denture model, and generates a plurality of control points on the profile contour, and positions and curvature of the control points is adjustable to generate the denture contour.

22. The denture dentition model establishing system according to claim 12, wherein the computing device further adjusts half of the denture models in the grids to find a profile contour of the denture models, and generating a plurality of control points on the profile contour, and positions and curvature of the control points is adjustable to make the denture contour conforming; copying the denture contours of the denture models in another half of the grids by mirroring, and making fine adjustments.

* * * * *